Oct. 7, 1958 S. EIDENSOHN 2,855,453
SYSTEM FOR HEATING AND COOLING ELECTRICAL BATTERIES
Filed Feb. 9, 1954 2 Sheets-Sheet 1
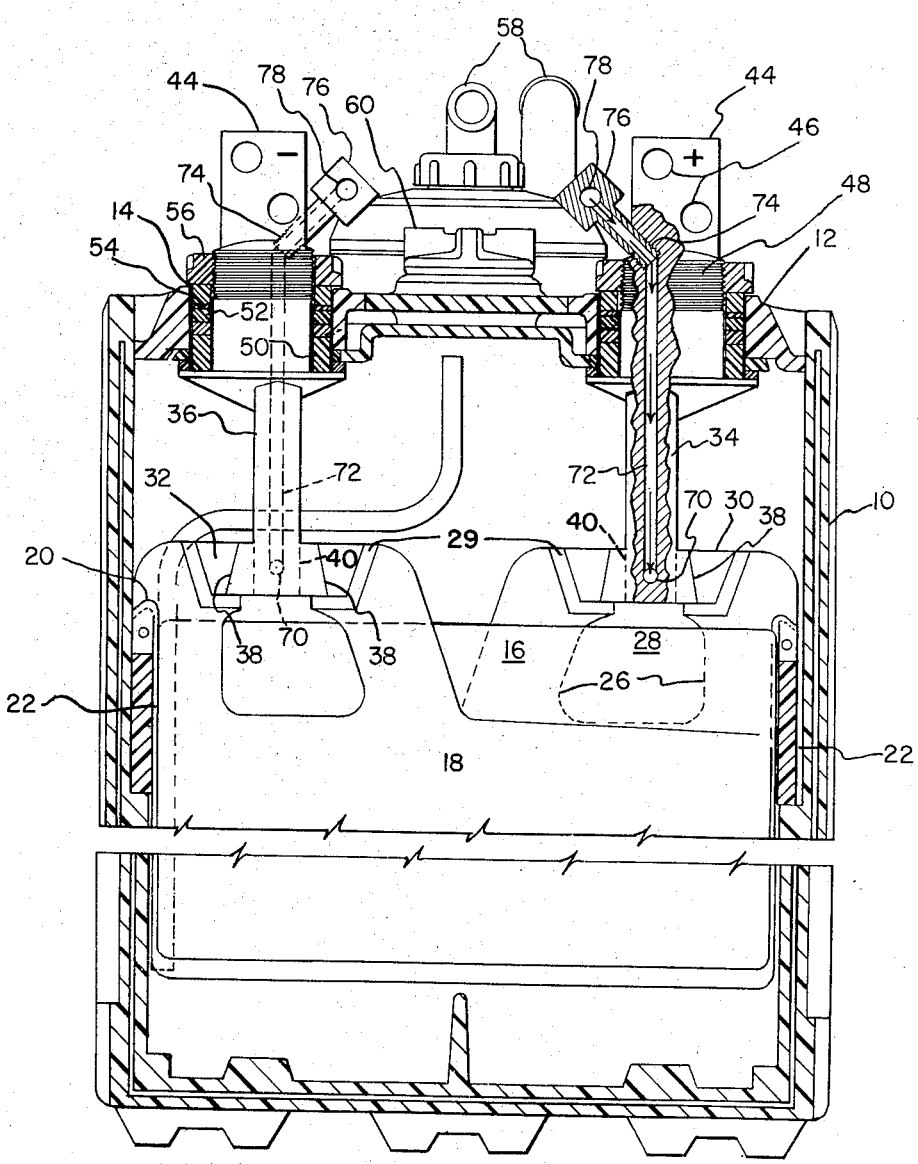
FIG. I.
INVENTOR
SAMUEL EIDENSOHN
BY George Sipkin
B. L. Zangwill
ATTORNEY

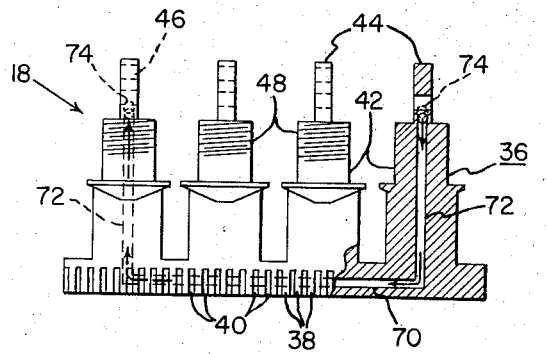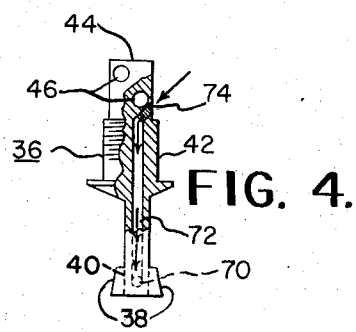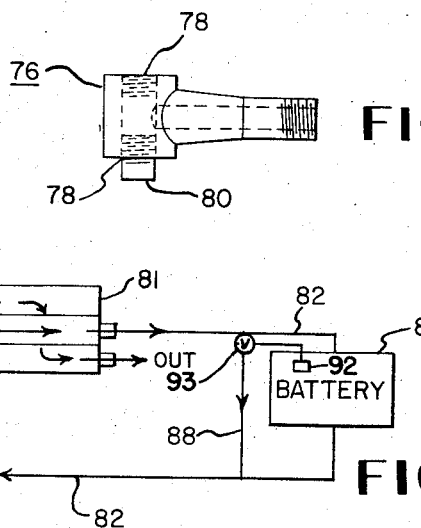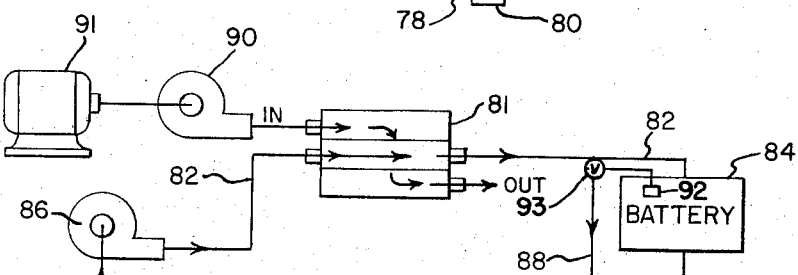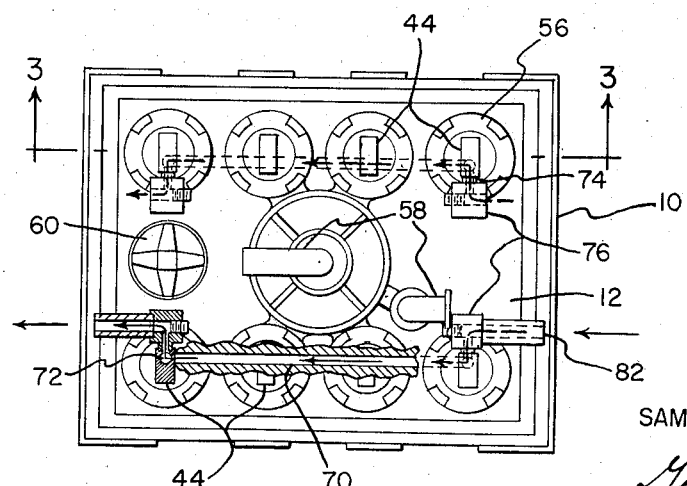

UNITED STATES PATENT OFFICE 2,855,453
Patented Oct. 7, 1958

2,855,453
SYSTEM FOR HEATING AND COOLING ELECTRICAL BATTERIES

Samuel Eidensohn, Washington, D. C.

Application February 9, 1954, Serial No. 409,280

4 Claims. (Cl. 136—161)

(Granted under Title 35, U. S. Code (1952), sec. 266)

The invention described herein may be manufactured and used by or for the Government of the United States of America for governmental purposes without the payment of any royalties thereon or therefor.

The present invention relates to an improved electrical storage battery and more particularly to a cell or battery in which fluid is circulated through structural elements in the battery for providing an efficient heat exchange system operable over a wide range of ambient temperatures.

In the operation of an electrical storage battery it is desirable to maintain the temperature of the battery as close as possible to ambient temperature. It is likewise desirable to preheat a battery prior to placing the battery in operation or use. Many methods have been devised in the past for attempting to achieve these desirable operating characteristics but none have proven to be very satisfactory. The various methods employed for accomplishing these advantageous features are known to be:

(a) Circulation of air, hot or cold, over the top and sides of the battery, which may be finned, in order to promote heat transfer;

(b) Induction of air into the cell to produce cooling by evaporation of water from the electrolyte;

(c) The application of external heat, such as placing an electrical resistance element adjacent the battery;

(d) Circulation of fluids, air or liquid, through coils placed in the electrolyte;

(e) Electrical heating by resistance elements incorporated in the sides or bottoms of the battery container;

(f) Passage of electrical current through the cell.

It will be seen from the above that various methods previously utilized have related to heating, cooling, or a combination of heating and cooling. The disadvantages of the above described old methods may be summarized somewhat as follows:

As to (a) above, this method is ineffective because of the small heat capacity of air and the poor heat transfer from the interior to the exterior of the cell. Careful measurement on a cell has shown that the heat transfer by such methods is about .005–.01 B. t. u. per minute per degree Fahrenheit (electroylte to air) per cubic foot of air. The heat required to change the temperature of the cell one degree Fahrenheit is about 200 B. t. u. Hence, assuming a factor of .01, and a temperature differential of 100 degrees Fahrenheit between the electrolyte and air, it would require an air flow of 2000 cubic feet per minute to cool the cell one degree per minute, on open circuit. This is generally entirely impracticable.

Method (b) is more effective as a cooling system than (a). A factor of .03 has been obtained by test. It is only slightly better as a heating system. However, even an increase of three times still leads to impractical volumes of air for effective control of temperature. This system also has the disadvantage that the greater cooling is obtained at a sacrifice of drying out the electrolyte, thereby necessitating frequent fillings to keep the level of the electrolyte above the plates. Air, after passing through the cell or battery, generally contains corrosive particles of electrolyte which create serious problems in upkeep of electrical equipment and ventilation ducts, fans, and the like when such apparatus is used in the heating or cooling system.

The remainder of the methods above noted also suffer from numerous disadvantages. External heating or cooling is greatly handicapped by poor heat transfer through the cell to the electrolyte. Even heating elements in the side of the jar are inefficient if dielectric material is used, as is normally the case, because of the excellent insulating properties of the material. Electrical heating needs a separate supply of suitable voltage and current which is not available under many circumstances and requires perfect insulation against attack by the electrolyte. Coils placed in the electrolyte are subject to corrosion and shock breakage, take up considerable volume which is needed for electrolyte, and require additional openings in the cover for access and connections. Metal coils are not practical for continuous immersion and plastic coils have poor heat transfer even in thin-walled tubing of low mechanical strength.

In view of the above, it is apparent that no safe, reliable and efficient means have been devised to provide adequate and efficient means for transferring heat to or from a battery. The present invention eliminates all the above difficulties by circulating a heating or cooling fluid through busbars or straps within the cell proper. This heating or cooling fluid may comprise, for example, pure water or a suitable anti-freeze solution of the type which will not change its physical state under the operating and ambient conditions and which will be a poor conductor of electricity. As is well known, water has a specific heat of 1 B. t. u. per pound or 62 B. t. u. per cubic foot, whereas air has a specific heat of .25 B. t. u. per pound or .075 B. t. u. per cubic foot. Hence the relative heat capacity, for equal volumes, is 835 for water, 1 for air. Thus 1 cubic foot of water per minute is equivalent to 835 cubic feet per minute of air for equal temperature changes. It is therefore apparent that the use of a liquid, such as water, for example, is highly desirable when compared with the use of air in such a system.

It is therefore an object of the invention to provide an improved heating or cooling system for electrical storage batteries.

Another object of the invention is to provide an improved heating or cooling system for storage batteries wherein the battery is operated at a substantially constant temperature.

A further object of the invention is the provision of improved heat transfer in the cell whereby the heat is transferred by direct metallic conduction to or from the plates of the battery thereby requiring the heat to pierce only one film of low resistance.

Still another object of the invention is the provision of a permanently located fluid passageway within each cell in the battery thereby eliminating the necessity of changing the plates, cases or covers.

Other objects and many of the attendant advantages of this invention will be readily appreciated as the same becomes better understood by reference to the following detailed description, when considered in connection with the accompanying drawings, in which like reference characters designate like parts throughout the figures thereof and wherein:

Fig. 1 is a cross-sectional view in elevation showing the details of a cell in a storage battery;

Fig. 2 is a plan view with parts in diagrammatic section of a battery, of which the detail section shown in Fig. 1 is taken;

Fig. 3 is a view in elevation, partly in section, showing a busbar of the battery taken on lines 3—3 of Fig. 2;

Fig. 4 is an end view in elevation, partly in section, of the busbar shown in Fig. 3;

Fig. 5 is a view in elevation of a special fitting for the fresh water circulating system; and Fig. 6 shows the elements of a heat exchange system used in the heating or cooling of the storage cell shown in Fig. 1.

Referring now to the drawings, wherein like reference characters designate like or corresponding parts throughout the several views, there is shown in Fig. 1 a sectional view of a cell comprising a part of a battery. In order to properly show the invention, a particular type of cell or battery is used herein, but it is to be understood that cells of different structure, adapted for receiving the circulating fluid passageways of this invention may also be utilized. The number of cells comprising the battery is immaterial, since the invention principally relates to the transfer of heat to or from all of the cells which comprise the battery proper.

The cell disclosed herein comprises a laminated jar 10 having a cover 12 secured in the top thereof in a customary manner, and which is provided with a plurality of openings 14 for receiving the positive and negative posts of the cell. Additional openings are provided in the cover in order to secure proper ventilation of the cell and also for watering of the cell when the electrolyte drops below a predetermined value. A plurality of positive plates 16, interlaced with negative plates 18, are positioned within the jar and are held in position above the jar base by means of a saddle 20, there being one saddle for each of the positive and negative plates, and an adapter 22. These saddles and adapters serve to properly position and separate the plates from one another in the jar proper. The positive and negative plates are substantially similar in form and each comprises a main body having upstanding separated portions 26 which form a cavity 28 therebetween. Positive and negative burning leads 30 and 32 respectively secure the positive and negative busbars 34 and 36 to thickened portions 29 on the upstanding separated portions 26 of each of their respective plates. In other words, the positive busbar is connected to all of the positive plates while the negative busbar is connected to all of the negative plates of the cell.

Referring more specifically to Figs. 3 and 4, the negative busbar 36 comprises a base portion which is flared outwardly towards the bottom and is provided with a plurality of vertically extending and parallel openings or slots 40. The openings or slots 40 in the flared base portion form a plurality of spaced lugs 38 each adapted to be secured to one of the negative plates, as by burning lead 32. The upper part of the busbar is provided with a plurality of posts 42, each having positioned on the top thereof upstanding members 44 which are appropriately bored at 46. Each of the posts is threaded at 48 for achieving an air and watertight fit between the cover and the inside portions of the laminated jar. Appropriate openings are positioned in the top of the cover for receiving posts 42.

In order to achieve the air and watertight fit, a pair of pressure rings 50, Fig. 1, are positioned around the posts and within the opening of the cell cover, these pressure rings being separated by a pair of post gaskets 52 and a ring spacing gasket 54. A seal nut 56 is screwed on the threaded portion 42 of the posts and bears at its bottom end against the gasket in order to achieve the above described air and watertight fit. Customary vent openings 58 and a water filling plug 60 are positioned in the top of the cell cover for providing access to the inside of the cell.

The aforementioned structure is that which is commonly known in the art and comprises the major elements of an electrical storage battery. The modification of this type of cell by the addition of new and inventive features comprises the novel means of either heating or cooling the cell. Each of the plate connecting straps or busbars 34 and 36 is provided with a bored horizontal passageway 70 which is connected with a vertical and like bored passageway 72 positioned in each of the end posts 42. The bored passageways 72 terminate in openings 74 positioned near the top portion of each of the above mentioned end posts. A T-fitting 76 is threadably connected in the end of each opening 74, and is provided at its upper end with an identical pair of openings 78 extending from the branch portion of the T. This T-fitting, shown in Fig. 5, is provided with a plug 80 secured in one of the end openings, the other of the openings being adapted for connection to a heating or cooling system as described hereinafter. The T-fittings 76 are inserted in each end of the positive and negative posts and the heat exchange fluid is caused to flow through these channels or passageways in the plate connecting straps or busbars as clearly shown in Figs. 1 and 3. The parts of the plate connecting straps are made of heavy metal whose electrical conductivity will not be appreciably reduced by the fluid channel. The thickness of the metal around the channel, which may be provided with a copper insert, is sufficient to assure non-penetration by the electrolyte and offers satisfactory resistance to shock. By means of this structure, the fluid flow system does not increase the weight of the cell, makes it possible to use standard plates and cell containers, and does not reduce the amount of space available for electrolyte.

An ordinary type of heat exchange system may be used for providing a heat exchange fluid to the cells. In a practical application, the heat exchanger 81 is serially connected by means of conduits 82, with a pump 86 and a cell or battery 84 which is to be supplied with heat or from which heat is to be extracted. A by-pass 88 is provided for by-passing the heat exchange fluid around the cell when the cell has reached a predetermined temperature. Suitable thermostatic controls may be incorporated in the circulating system or in the cell so as to maintain the temperature in the cell at a proper value. The details of the thermostatic control system are not considered a part of this invention since many practical and known systems can be used for this purpose. For example a suitable thermostat 92 may be placed within the cell which, when a predetermined temperature has been reached, will open or close a switch whereby a solenoid-operated valve 93 in bypass 88 will be opened or closed. In order to supply heat to or take away heat from heat exchanger 81, a pump 90 is provided in a separate heat exchange circuit.

The flow rate in the system is not critical but should be sufficient to produce turbulent flow so that the heat transfer across the fluid film is maximized. For example, with water, a flow rate of 0.3 gallon per minute is ample for a $\frac{3}{8}$" diameter channel. With this rate of flow, a temperature change of 1 degree Fahrenheit corresponds to a heating or cooling rate of 2.5 B. t. u. per minute.

Piping between points of different potential in the battery is made of insulating material to prevent leakage occurrence between these points. For large installations, it is desirable to insert a suitable conductivity indicator in the flow system to warn against contamination of the fluid.

In operation of the heating system, the fluid, which may be distilled water, is raised to the necessary temperature, such as 160–180 degrees Fahrenheit and pumped through the cell until the cell reaches a predetermined temperature. At this time, the valve 93 in by-pass 88 is opened and the channels in the cell busbars bypassed by means of the thermostat 92. The water is thereby by-passed around the cell until the cell again reaches a predetermined low value, at which time under control of the thermostat the fluid will again be recirculated therethrough.

In the event it is desired to cool the cell, the same system is utilized except that there will be a reversal in temperatures. The circulating fluid is pumped through the cell passage, accumulating heat transferred thereto from the busbars, and is delivered to the heat exchanger in the system. The fluid is cooled and then recirculated through the cell until the latter drops to a predetermined value, at which time under control of the thermostat the pump is stopped or the by-pass opened to divert the fluid from the cell. When the temperature of the cell rises, the by-pass is closed and fluid again circulated therethrough.

From the above it will be seen that many advantages are derived from cooling the cell proper in this fashion. Heat transfer between the plates and electrolyte and the heating or cooling fluid is obtained by direct metallic conduction to or from the plates through only one film of low resistance i. e. the wall surfaces of the passageways or channels in the busbars. This permits a channel of small enough surface to fit within the plate straps to yield sufficient heat transfer for adequate control of cell temperature. All other known methods of heating and cooling involve the passage through several films of low heat transfer plus passage through dielectric material of poor heat conductivity. Hence, the invention described above, has the advantages of much greater efficiency and smaller temperature differential for the same amount of heat flow. The fluid flow system within the cell is entirely contained within the metal plate connecting straps. It is not exposed to corrosion by the electrolyte, cannot break under any shock insufficient to break the sturdiest part of the battery, and requires no upkeep.

It has been found that the exact horizontal position of the passageway in the plate connecting straps varies according to whether the cell is to be heated or cooled. In the event of cooling the location of the fluid channel should be at the top of the plates. For heating, the same location will be effective but will involve a larger temperature differential between the top and bottom of the cell.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. An electrical storage battery comprising a casing, an electrolyte in said casing, a plurality of spaced positive and negative plates alternately arranged in said electrolyte, positive and negative busbar means within said casing respectively connected to said positive and negative plates, said busbar means comprising a metallic member having a pair of upstanding terminal posts on each end thereof, and a communicating tunnel-like passageway in said metallic member and said posts providing a fluid passageway for transferring heat to or from said cell electrolyte by means of said plates.

2. A battery construction enabling said battery to be maintained at a constant operating temperature comprising positive and negative plates immersed in an electrolye, busbars connecting said positive and said negative plates, terminals connected to said busbars, and a fluid passageway within said terminals and said busbars whereby a liquid may be circulated therethrough to carry heat to or away from said battery.

3. A storage cell having positive and negative plates alternately arranged within an electrolyte, busbars respectively connected to said positive and negative plates, liquid conduits within said busbars, and means for admitting a liquid into and out of said conduit whereby said liquid exchanges heat with the plates and electrolyte of said battery through the walls of said conduit.

4. An electrical storage cell comprising a casing, an electrolyte in said casing, a plurality of spaced positive and negative plates alternately arranged in said electrolyte, positive and negative busbars within said casing respectively connected to said positive and negative plates, said busbars comprising a metallic strap connected between terminal posts on each end thereof, heat exchange means comprising a passage formed in said busbars of said cell, and inlet and outlet means connected to said passage for conveying fluid to and from said busbars adapted for transferring heat to and from said cell electrolyte by means of said plates.

References Cited in the file of this patent

UNITED STATES PATENTS

| | | |
|---|---|---|
| 470,260 | Riatti | Mar. 8, 1892 |
| 563,972 | Kroseberg et al. | July 14, 1896 |
| 854,312 | Skinner et al. | May 21, 1907 |
| 1,587,425 | Schepp | June 1, 1926 |
| 1,926,157 | Lormor et al. | Sept. 12, 1933 |
| 2,666,091 | Martin et al. | Jan. 12, 1954 |

FOREIGN PATENTS

| | | |
|---|---|---|
| 717,389 | Germany | Feb. 13, 1942 |